United States Patent [19]

Styrkowicz

[11] 3,824,053

[45] July 16, 1974

[54] MOLD FOR MOUNTING SWITCH BLADES AND THE LIKE

[75] Inventor: Stanley J. Styrkowicz, Chicago, Ill.

[73] Assignee: Guardian Electric Manufacturing Company, Chicago, Ill.

[22] Filed: May 15, 1972

[21] Appl. No.: 253,173

[52] U.S. Cl......... 425/123, 425/436 R, 425/129 R, 425/441, 425/442, 425/444, 249/66 R
[51] Int. Cl.............................................. B29f 1/10
[58] Field of Search ........... 425/117, 129, 249, 123, 425/129 R, 436 R, 441, 442, 444; 249/91, 68, 83, 66

[56] References Cited
UNITED STATES PATENTS

| | | | |
|---|---|---|---|
| 2,306,732 | 12/1942 | Huxam............................... | 425/123 |
| 2,369,291 | 2/1945 | Frank et al......................... | 425/123 |
| 3,210,453 | 10/1965 | Smith............................. | 425/123 X |
| 3,234,756 | 2/1966 | Hanson........................... | 425/116 X |
| 3,303,256 | 2/1967 | Morin............................... | 425/129 |
| 3,433,292 | 3/1969 | McDonald...................... | 425/249 X |
| 3,467,986 | 9/1969 | Canty et al. ...................... | 425/117 |
| 3,616,845 | 11/1971 | Farmer........................... | 249/83 X |

Primary Examiner—J. Spencer Overholser
Assistant Examiner—David S. Safran
Attorney, Agent, or Firm—Molinare, Allegretti, Newitt & Witcoff

[57] ABSTRACT

An improved mold for the manufacture of stacked contact blades provides a mold cavity with opposed sides of the cavity having fingers that may extend partially into the cavity to define various configurations for the ultimate molded product. The fingers also act to hold the contact blades in a rigid, discrete position during the molding operation.

1 Claim, 16 Drawing Figures

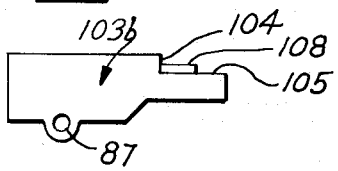
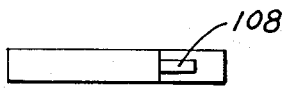
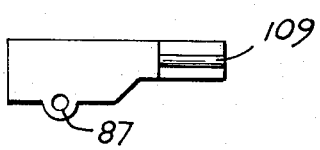
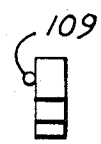
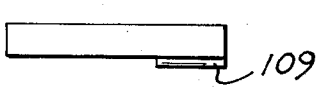
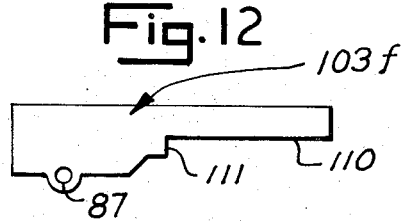
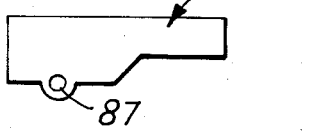
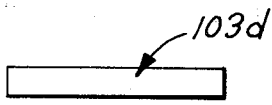
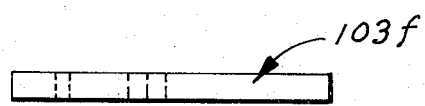
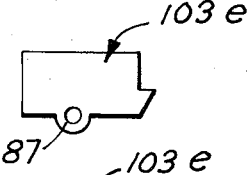

MOLD FOR MOUNTING SWITCH BLADES AND THE LIKE

BACKGROUND OF THE INVENTION

This invention relates to an improved mold for mounting switch blades and the like. More particularly, this invention is an improvement over the mold disclosed in U.S. Pat. No. 3,467,986. For purposes of disclosure, U.S. Pat. No. 3,467,986 is incorporated herewith by reference.

In U.S. Pat. No. 3,467,986, there is disclosed a mold for the manufacture of stacked switch blades and the like. Generally, this mold is comprised of a mold cavity formed of steel blocks with a cover plate for the top of the cavity. Opposite end surfaces of the molded product are defined by sets of opposed pivotal fingers positioned in a channel in the mold body. These fingers include slots defined in their adjacent faces. Contact blades or the like may be positioned in these slots. The bottom and side surfaces of the molded product are defined by the exposed surfaces of the channel in the mold body intermediate the opposed sets of fingers. The top surface of the molded product is defined by the cover plate.

Thus, when the cover plate is firmly locked into a closed position on the mold body with switch blade elements held by the sets of fingers, a mold material can be injected into a defined cavity through an appropriate sprue and gates so as to provide for a final molded product.

This prior art mold has proven to be extremely useful and advantageous in the preparation of stacked switch blades which must be maintained in a uniform spaced relation to one another. However, the disclosed apparatus has in the past only been utilized to provide blades in blocks having a substantially rectangular shape.

It has been found desirable to provide a molded switch block having an integral bracket for example. Another desirable product is a molded switch block with a plurality of blade elements molded therein with at least one of the blade elements having a molded lifter attached thereto. Various other molded product configurations are also quite useful and in demand. The present invention provides an improved mold for providing these desired products not heretofore available using the techniques disclosed in U.S. Pat. No. 3,467,986.

SUMMARY OF THE INVENTION

In a principal aspect, the present invention comprises an improved mold for the manufacture of molded material having elements discretely positioned therein. A mold body having a cavity defined therein with at least two sides of the cavity being defined at least in part by one of two adjacent movable fingers. The fingers are positioned in relation to the cavity to hold an element or elements in a discrete position therein so that the molded material may be flowed into the cavity to hold the element in a fixed position in relation thereto.

It is thus an object of the present invention to provide an improved mold for the manufacture of molded products.

It is a further object of the present invention to provide an improved mold wherein elements may be molded in a molded product the molded product having a shape other than a substantially parallelepiped shape.

One further object of the present invention is to provide an improved mold wherein ejection of the molded product from the mold is effected and assisted by fingers extending into the mold and defining part of the mold cavity.

One further object of the present invention is to provide an improved mold which can be adapted to provide a variety of molded shapes in combination with discrete elements molded into the cast product.

These and other objects, advantages and features of the present invention will be set forth in greater detail in the description which follows.

BRIEF DESCRIPTION OF THE DRAWING

In the detailed description which follows, reference will be made to the drawing comprised of the following Figures:

FIGS. 2 through 13 are various elevational views of mold fingers which may be utilized in combination with the mold body and cover plate comprising the invention.

DESCRIPTION OF THE PREFERRED EMBODIMENT

Figure 1:
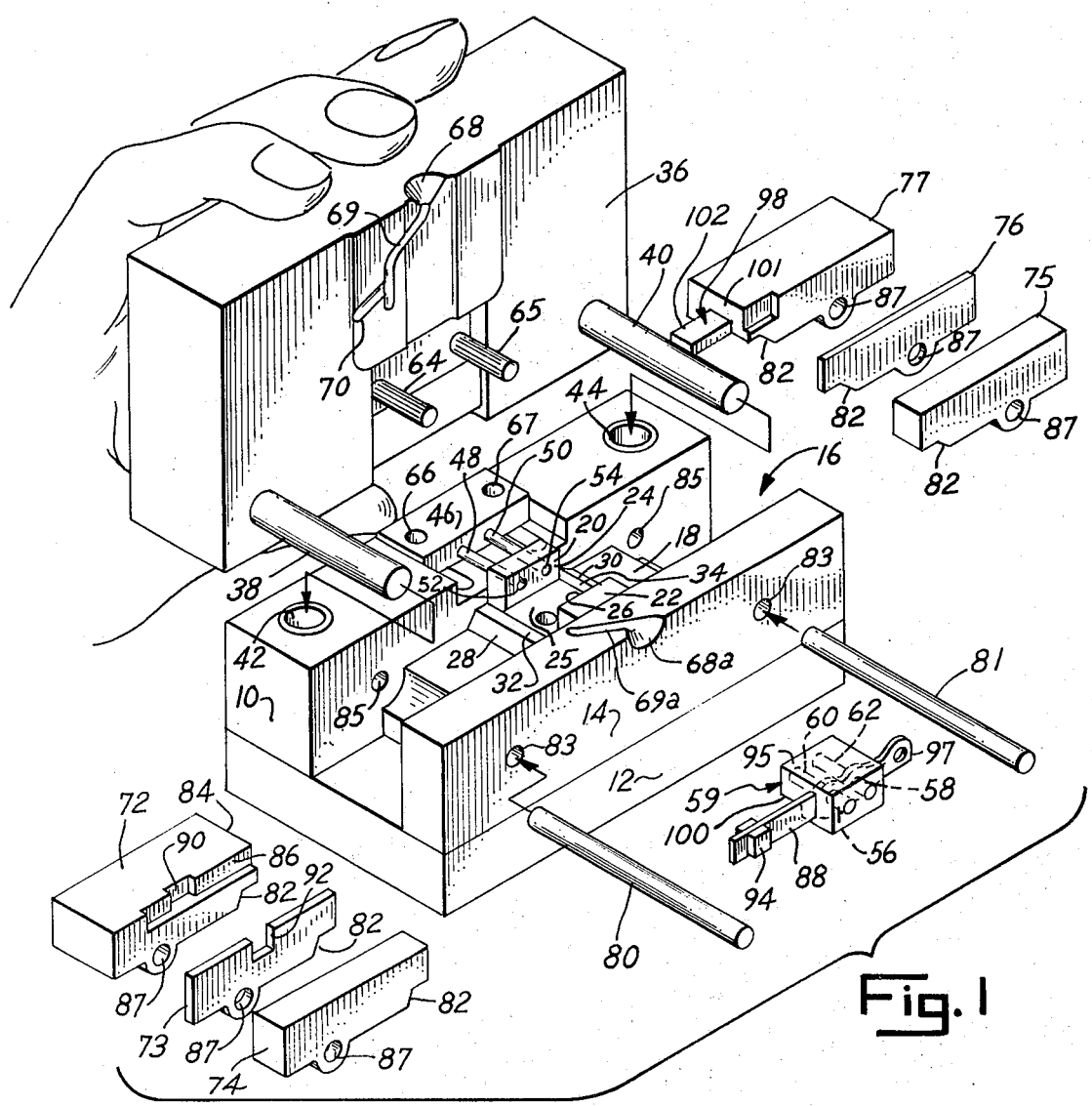
FIG. 1 is an exploded perspective view of the improved mold of the present invention.

The mold assembly as shown in FIG. 1 is substantially the same as that disclosed in U.S. Pat. No. 3,467,986, except for the addition of the improved fingers and other modifications to accomodate the improved fingers illustrated in FIG. 1. Thus, a mold cavity is formed from a plurality of steel blocks including a base block 10, a back block 12 and a front back 14. The blocks 10, 12 and 14 are attached to one another to define a channel 16.

The base block 10 has a shaped extension 18 projecting into the channel 16. Side blocks 20 and 22 of a cavity forming member 25 extend upward from the member 25 which is attached to the extension 18. Blocks 20 and 22 define opposite end surfaces 24 and 26 respectively in the product mold cavity forming member 25. Support blocks 28 and 30 are fastened to extension 18 and include upper land surfaces 32 and 34 respectively. Surfaces 32 and 34 are coplanar with the lower planar surface 27 of cavity forming member 25. The parts so far described are all rigidly fastened together so that they are substantially immovable relative to each other.

A cover plate 36 is adapted to fit over the above-described mold body to provide an enclosed mold cavity. The cover plate 36 is guided into position relative to the remainder of the mold body of rods 38 and 40 which fit into corresponding openings 42 and 44 respectively in the back block 12.

A sliding carrier 46 mounted in channel 47 of back block 12 includes a pair of mounting hole pins 48 and 50 which extend through openings 52 and 54 respectively in block 20. The mounting hole pins 42 and 50 extend through openings in contact blades or elements as at 56 and 58 in FIG. 1 and simultaneously define openings as at 60 and 62 in a final molded product 59 in FIG. 1. The openings 60 and 62 are provided so that fasteners may be positioned through the molded product 59 to fasten the product 59 to some other assembly.

The cover plate 36 includes a pair of guide pins 64 and 65 which extend through holding pin openings 66 and 67 respectively in sliding carrier 46. The guide pins 64 and 65 are inclined so that as the cover plate 36 is lowered over the remainder of the mold, the action of the pins 64 and 65 in cooperation with the openings 66 and 67 will cause the carrier 46 to be transported inwardly. Thereby, the pins 48 and 50 are directed through the center of the mold cavity to define the openings 60 and 62 in the product 59 as described above. The cover plate 36 includes a sprue 68 and gates 69 and 70 which cooperate with a spure 68a and gate 69a in front block 14 to provide a pathway for the molten mold material.

The mold cavity for the product 59 is defined by the cover plate 36, the cavity forming member 25 described above and a plurality of fingers 72–77 which are pivotally mounted on pivot pins 80 and 81 extending through appropriate openings 83, 85 in front block 14 and rear block 10 respectively and openings 87 in the fingers 72–77. The fingers 72–77 pivot to a first position to define the remaining sides and various inclusions and extensions of the mold cavity. Thus, referring to FIG. 1, the fingers 72–77 are compressed together and positioned so that inclined surfaces 82 on the fingers 72–77 are in face-to-face contact with the inclined surface of the appropriate support block 28 or 30. The geometrical arrangement of the entire mold is thus substantially the same as shown in the 3,467,986 patent identified above.

The inventive features of the present invention are directed to the specific construction of the fingers as at 72–77 and the utilization of these unique finger constructions in combination with the remaining components which comprise the mold of the present invention. First, a description of some of the improved features of the present finger construction of the present invention will be set forth by referring to FIG. 1. Reference will then be made to FIGS. 2–13 for a discussion of alternative finger constructions and the type of molded product resulting from such constructions In FIG. 1, finger 72 includes an end surface 84 which defines one side of the final molded product 59. A longitudinal notch 86 is defined in the finger 72 for receiving an element 88, for example, a contact blade. The notch 86 is similar to like notches described in the '986 patent. Very importantly, however, the fingers 72 include an additional notch 90 for mold material. In communication with notch 90 when the mold is in a completely closed and assembled condition is gate 70.

Adjacent finger 73, likewise, includes a notch 92 which is similar to notch 90. Finger 74 defines one flat outside surface of a secondary mold cavity for a lifter 94 attached to mold element 88. Also, finger 74 defines the side surface of the molded product.

Thus, mold material entering through the sprue 68, gate 69 and gate 70 will flow into the region defined by the notches 90 and 92. Assuming that element 88 is positioned in the mold notch 86 in the fashion described in the 3,467,986 patent, and further assuming that the element 88 has an opening therethrough connecting notches 90 and 92, mold material will flow into the notches 90 and 92 and be interconnected through the opening in element 88. In this manner, lifter 94 is attached to the element 88 assuming the element 88 is a contact blade. Simultaneously, of course, mold material passes into the cavity defined by cavity forming member 25.

Thus, mold material is introduced simultaneously into two cavities by the construction of the present invention and it is therefore possible to mold a lifter as well as the contact block of the present invention. Of course, for purposes of illustration, the product 59 is shown only having a single element 88. Clearly, it is possible to mold additional elements with or without lifters in the same molded product.

Finger 77 opposed to finger 72 also includes a notch 96 adapted to receive the opposite end 97 of element 88 and hold that end 97 in a fixed position in cooperation with finger 76. Finger 76 is opposed to finger 73. Importantly, finger 77 includes a projection 98 which extends into the region defined by cavity forming member 25 so as to define a shaped surface as at 100 of the product 59. It should be noted that the finger 77 also includes an end surface 101 which defines one side of the product and that the projections 98 of finger 77 includes a planar surface 102 which also defines a surface of the final molded product 59. The projection 98 can extend partially or all the way across the lower planar surface 27 of the cavity forming member 25.

If a projection 98 extends only partially across the surface 27 of member 25, then a similar projection from the opposed finger 72 can be made to cooperate with projection 98 thus defining a complete planar surface and shape of the final molded product 59. These particular finger configurations illustrated in FIG. 1 and discussed are merely examples of the type of fingers which may be utilized in the improved combination of the present invention. The fingers 72–77 of FIG. 1 define a molded product with one blade 88 having one lifter 94 and having a bracket portion 95. It would be possible to define openings in the bracket portion 95 by providing downwardly extending pins (not shown) in the cover plate 36 or upwardly extending pins in the projection 98.

Figure 2:
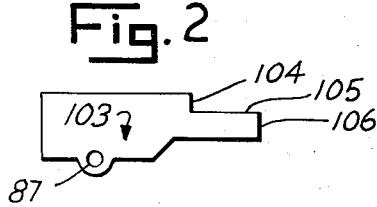
Figure 3:
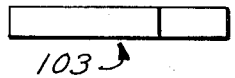
Figure 3A:

Turning now to FIGS. 2–13, it will be noted that there are numerous other possibilities for finger configurations limited only by the imagination of the product engineers. In FIGS. 2 and 3, for example, a surface 104 of a finger 103 defines one side of the product. A second surface 105 defines another side of the product and a third surface 106 will define still another surface of the product. As can be seen in FIG. 3a, it is possible to provide a groove 107 in a surface 105 of finger 103a to thereby define a projection in the final molded product.

In FIGS. 4 and 5, still another finger construction is shown. In this finger 103b surface 104 defines one side of the molded product, surface 105 a second surface, and a projection 108 defines a groove in the final molded product. The projections 108 may be centered on the finger as shown in FIG. 5 or offset from the center as shown in FIG. 5a.

FIGS. 6 and 7 illustrate still another possible finger construction. As shown in side elevation of FIG. 6, a projection 109 (alternatively a groove) may be provided to define a groove (projection) in one of the side surfaces of the final molded product. This projection 109 is also illustrated in the end view of FIG. 6a.

Referring to FIGS. 8 and 9, the finger 103d may extend completely across the mold cavity defined by member 25 and thus block out the entire portion of the internal mold cavity. In this manner, the mold cavity may be utilized to simultaneously manufacture a plurality of molded products.

FIGS. 10 and 11 illustrate that the finger 103e may be foreshortened to thereby extend the product by providing an "inclusion". By inclusion it is ment that a flange or projection from the product may be provided or an opening or depression in the product may be defined by appropriately altering the configuration of one of the fingers. FIGS. 10 and 11 illustrate, in two views, one finger construction for providing a flange on the product where the finger 103e is used in combination with adjacent, parallel fingers 76.

FIGS. 12 and 13 illustrate that the finger 103f may extend across the top portion of the cavity defined by the member 25 to permit mold material to flow into the bottom portion adjacent the lower planar surface of the cavity formed by the member 25. Thus, the surface 110 defines one side of the molded product and another surface 111 defines another side of the molded product.

Clearly then, the multiplicity of the arrangements and number of complex shaped products that can be manufactured by the mold of the present invention is greatly expanded. Whreas in the prior art only two planar sides of the molded product were shown to be defined by the fingers and the fingers were modified only to provide for holding elements such as contact blades, it is now possible to further modify fingers and provide for many complex shapes of the final molded product. Thus, the invention is to be limited only by the following claims and their equivalents.

I claim:

1. An improved mold for mounting a plurality of mold elements embedded in a main block of molded material with means for simultaneously providing a separate portion of molded material attached to only one element comprising, in combination:

a mold body having a main mold cavity therein, said main mold cavity defining a first pair of opposed, spaced side walls; and a plurality of opposed mold fingers pivotally mounted about opposed parallel axes on said mold body intermediate said first pair of opposed side walls, said fingers defining a third and fourth generally opposed connecting side wall for said main block of molded material intermediate said first pair of opposed side walls, said fingers for at least one of said third and fourth side walls also defining, at least in part, a bottom wall of said cavity, at least one of said fingers also including at least one shaped notch defining a discrete mold material cavity in combination with one element distinct from the main mold cavity, said discrete cavity in communication with only one element to receive a separate portion of molded material, said mold fingers having a first pivot position, said fingers also having slots to receive and hold said elements in said main mold cavity and to maintain one of said elements in communication with the discrete mold material cavity when in said first pivot position, means for supplying mold material to said cavities simultaneously for molding said mold material integrally with said elements, said main mold cavity providing a single molded part including all the elements in the main mold cavity and said discrete mold cavity providing a discrete molded part with one of the elements included therein, said fingers being pivotal from the first position to another position for transporting therewith from the main mold cavity the molded material including embedded elements, said bottom wall portion of said fingers providing a means for positive movement of said molded material from said main mold cavity when pivoting from the first position.

* * * * *